(12) United States Patent
Connor et al.

(10) Patent No.: US 11,879,387 B2
(45) Date of Patent: Jan. 23, 2024

(54) SYSTEM AND METHOD FOR DILUTING VAPOR AND GENERATING ELECTRICITY

(71) Applicant: Audubon Engineering Company, L.P., Houston, TX (US)

(72) Inventors: Brian Connor, Houston, TX (US); Sam Rayford Turner, Nacogdoches, TX (US)

(73) Assignee: Audubon Engineering Company, L.P., Houston, TX (US)

( * ) Notice: Subject to any disclaimer, the term of this patent is extended or adjusted under 35 U.S.C. 154(b) by 0 days.

(21) Appl. No.: 18/134,259

(22) Filed: Apr. 13, 2023

(65) Prior Publication Data

US 2023/0332537 A1 Oct. 19, 2023

Related U.S. Application Data

(60) Provisional application No. 63/330,566, filed on Apr. 13, 2022.

(51) Int. Cl.
*F02C 3/22* (2006.01)

(52) U.S. Cl.
CPC ............ *F02C 3/22* (2013.01); *F05D 2240/36* (2013.01)

(58) Field of Classification Search
CPC ....................................................... F02C 3/22
See application file for complete search history.

(56) References Cited

U.S. PATENT DOCUMENTS

| | | | | |
|---|---|---|---|---|
| 4,380,400 A | * | 4/1983 | Searle | G01N 33/0013 374/37 |
| 4,408,468 A | * | 10/1983 | Alefeld | F25B 27/007 62/476 |
| 4,629,413 A | * | 12/1986 | Michelson | F23D 14/08 431/9 |

(Continued)

OTHER PUBLICATIONS

WinGD, "Volatile Organic Compounds as Fuel", Winterthur Gas & Diesel Ltd., Dec. 20, 2018 [accessed at https://www.wingd.com/en/documents/general/papers/wingd-article-april-2019-voc.pdf/] (Year: 2018).*

(Continued)

*Primary Examiner* — Lorne E Meade
(74) *Attorney, Agent, or Firm* — Intellectual Property Consulting, LLC; Stephen M. Kepper

(57) ABSTRACT

A system and method for converting hazardous waste vapors into a renewable energy source is disclosed. The system comprises a feeding system operatively coupled to a combustion system. The feeding system includes a vapor byproduct source capable of producing hydrocarbon vapors and a means for separating any liquids or particulates from the hydrocarbon vapor to create a purified vapor. The combustion system includes a compressor operable to pressurize the purified vapor to a select pressure range, a means for enriching the purified vapor with a select percentage of natural gas to form a fuel mixture, and a generator operable for converting the combined fuel mixture into electricity. Optionally, the combustion system may utilize a microturbine in combination with a fuel storage system, eductor, and a calorimeter and density meter to ensure maximum energy efficiency based on a select input range for fuel composition and pressure.

10 Claims, 2 Drawing Sheets

(56) References Cited

U.S. PATENT DOCUMENTS 5,762,885 A * 6/1998 Debbage ............... B01D 53/88
422/177
6,895,760 B2 5/2005 Kesseli

OTHER PUBLICATIONS

IPCO Power Brochure entitled "IPCO Power's Vapour Processing System" (https://www.ipcopower.com/uploads/1/2/3/0/12301483/ ipco_power_vapour_processing_systems.pdf), Wayback Machine archive date Jan. 21, 2022.

* cited by examiner

| Item/Description (fugitive emissions sources) | Microturbine Selection | VOC Total Flow (SCFM) | VOC Total Flow (SCFD) | NG Total Enrichment (SCFD) | KW Supply to Grid | Efficiency Gain |
|---|---|---|---|---|---|---|
| 48 Trucks/Day; Gasoline (CBOB, RBOB) | 2-C200 ICHP - High Pressure Natural Gas | 152 | 72,912 | 32,889 | 5,569 KW/Day | 68% |
| 90 Trucks/Day; Gasoline (CBOB, RBOB) | 3-C200 ICHP - High Pressure Natural Gas | 284 | 136,696 | 61,661 | 12,205 KW/Day | 72% |
| 10 Railcars/Day; Ethanol (95% DFE; 5% CBOB) | 2-C65 ICHP - Digester Gas | 92 | 38,595 | 13,145 | 0 KW/Day | 31% |
| 48 Railcars/Day; WTI Crude | 4-C200 ICHP - Digester Gas | 253 | 182,128 | 81,695 | 6,846 KW/Day | 67% |
| 1 Barge/Day; WTI Crude | 4-C200 ICHP - Digester Gas | 221 | 159,282 | 71,447 | 5,088 KW/Day | 68% |
| 4 Barges/1.5 Days; WTI Crude | 2-C1000 ICHP - Digester Gas | 885 | 637,126 | 285,791 | 32,433 KW/Day | 47% |
| 1 Afframax/3days; WTI Crude | 4-C1000 ICHP - Digester Gas | 1,062 | 1,401,678 | 640,763 | 239,304 KW/Batch | 42% |
| 2 Afframax/3days; WTI Crude | 8-C1000 ICHP - Digester Gas | 2,123 | 2,548,506 | 1,281,526 | 499,781 KW/Batch | 43% |

FIG. 2

SYSTEM AND METHOD FOR DILUTING VAPOR AND GENERATING ELECTRICITY

RELATED APPLICATIONS

This application claims priority to U.S. Provisional Application No. 63/330,566 filed Apr. 13, 2022. The entire contents of the above application are hereby incorporated by reference as though fully set forth herein.

FIELD

The present application relates to the field of vapor recovery systems. More specifically, the present invention relates to systems for converting recoverable vapors into renewable energy.

BACKGROUND

As a result of the global demand for trading and exchanging crude oil and its derivatives, like gasoline, these commodities are often stored before being transported from one place to another or used. During storage, gases from the liquid oil separate and rise to the top forming vapors made of volatile organic compounds ("VOC"), which are also commonly referred to as "fugitive emissions." In the case of crude oil, these gases largely are made from methane, which is harmful to the environment. In order to control the emissions of these gases, a variety of systems have been developed to dispose of these emissions, including systems incorporating a flare, vapor recovery units ("VRUs"), or vapor combustion units ("VCUs").

VRUs utilize a carbon bed and blowers as a means of recovery for Gasoline/Transmix, but these systems have several drawbacks. VRUs create maintenance expenses as the carbon beds have to be replenished on a routine 1-2 year interval. VRUs utilize a knockout pot, blowers, multiple pumps, and extensive piping arrangement for operation. VRUs are inefficient and typically provide minimal volume return based on the throughput of loading (for example, 1000 gallons were transferred and 1 gallon of product was recovered by means of VRU with Carbon Bed). As a result, VRUs are slowly being serviced out and replaced with VCUs.

VCUs provide 99.9% destruction of VOCs but still create harmful emissions and do not include a mechanism for converting these waste byproducts into renewable energy. VCUs traditionally were developed off propane and natural gas and due to newer CO/CO2 emissions requirements will be utilizing natural gas only. VCUs utilize a smaller ratio of natural gas (20-30% methane) to vapor to dilute the contaminants found in vapor. The combustion happens in an atmospheric state inside the vapor combustion stack. VCUs operate intermittently, so only when loading, and therefore use significant natural gas for intermittent startup/shutdown. VCUs for truck or rail racks inject natural gas at the upstream point of combustion, and for the marine loading cases, they inject at both the point of loading and combustion. VCUs combust natural gas mixed with vapor in an atmospheric state using a fresh source of ambient oxygen by means of an induction fan into the stack. As a result, these VCUs produce large quantities of CO and CO2 emissions with no means of after-treatment or means of capturing nitrogen or sulfur species.

While VCUs and VRUs have minimized harmful emissions when compared to prior alternatives, there is always a need for systems that further reduce pollution and increase energy efficiencies.

BRIEF SUMMARY OF THE INVENTION

It is the object of this invention to provide a system that converts hazardous vapors into a renewable energy source while simultaneously lowering harmful emissions. The system comprises a feeding system operatively coupled to a combustion system. The feeding system includes a vapor byproduct source capable of producing hydrocarbon vapors and a means for separating any liquids or particulates from the hydrocarbon vapor to create a purified vapor. The combustion system includes a compressor operable to pressurize the purified vapor to a select pressure range, a means for enriching the purified vapor with a select percentage of natural gas to form a fuel mixture, and a generator operable for converting the combined fuel mixture into electricity. The combustion system may utilize a microturbine as a generator in combination with a fuel storage system, eductor, and a calorimeter and density meter to ensure maximum efficiency while using the microturbine based on select input ranges for fuel composition and pressure.

In an alternative embodiment, the system includes a heat recovery system capable of capturing and converting exhaust gases from the generator into renewable energy using, for example, a heat pump and a generator. Optionally, a continuous emission monitoring system analyzer may be used to analyze exhaust emissions from the generators of the system to ensure compliance with environmental emission standards.

In an alternative embodiment, a method for converting hydrocarbon vapors into renewable energy is disclosed. The method comprises the steps of producing a hydrocarbon vapor from a vapor byproduct source, separating liquids and particulates from the hydrocarbon vapor to create a purified vapor, compressing the purified vapor to a select pressure range, enriching the purified vapor with a select percentage of natural gas to form a combined fuel mixture, and converting the fuel mixture into electricity.

BRIEF DESCRIPTION OF THE DRAWINGS

The foregoing and other objects, features, and advantages of the invention are apparent from the following detailed description taken in conjunction with the accompanying drawings in which like parts are given like reference numerals and, wherein:

FIG. 2 is a table showing electricity generated from recoverable vapors using the embodiments of the present invention.

Figure 1:
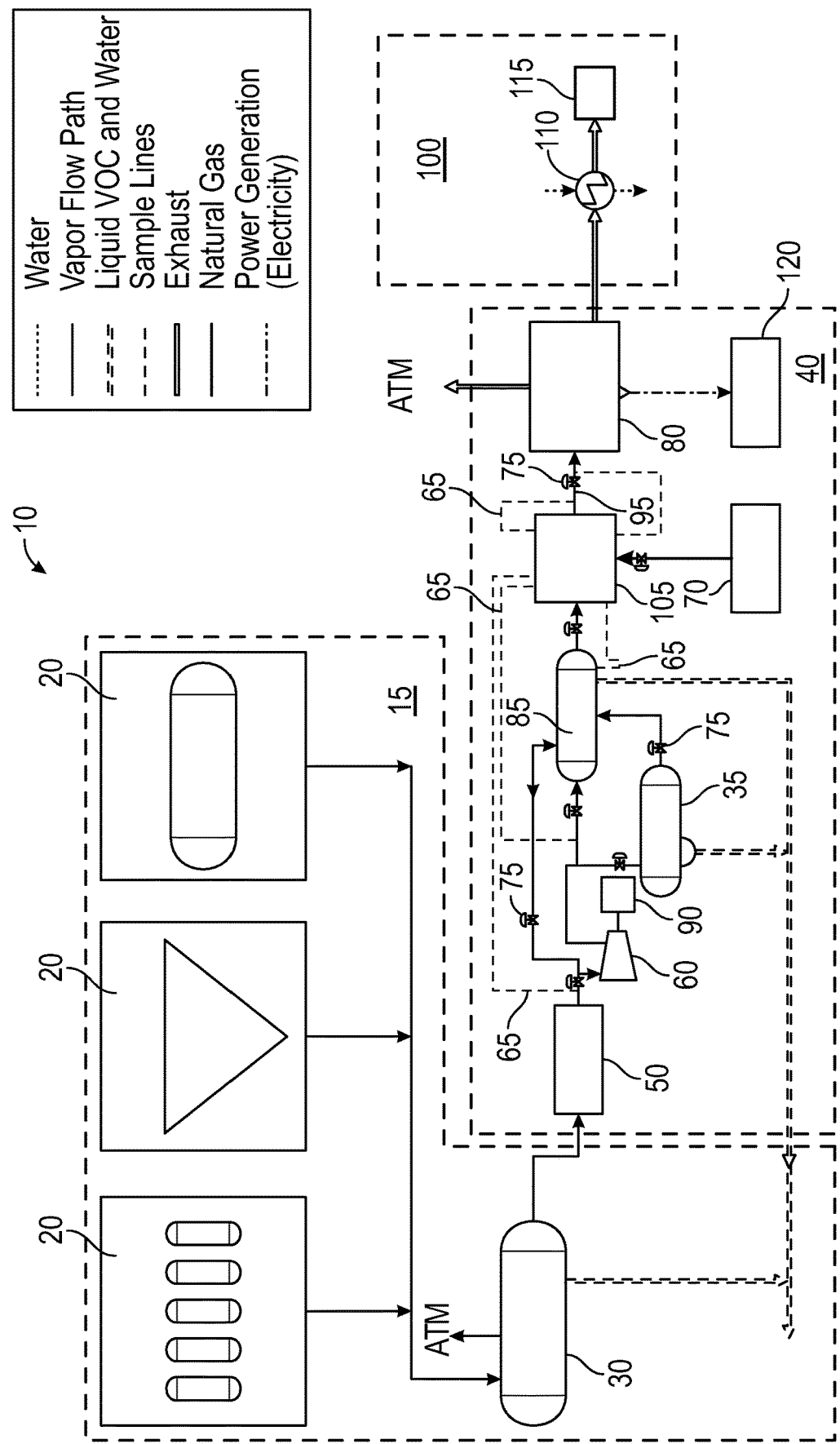
FIG. 1 is schematic view of a system for converting recoverable vapors into electricity in accordance with an embodiment of the present invention.

The images in the drawings are simplified for illustrative purposes and are not depicted to scale. Within the descriptions of the figures, similar elements are provided similar names and reference numerals as those of the previous figure(s). The specific numerals assigned to the elements are provided solely to aid in the description and are not meant to imply any limitations (structural or functional) on the invention.

The appended drawings illustrate exemplary configurations of the invention and, as such, should not be considered as limiting the scope of the invention that may admit to other equally effective configurations. It is contemplated that features of one configuration may be beneficially incorporated in other configurations without further recitation.

DETAILED DESCRIPTION

Turning to FIG. 1, a flow diagram of a first embodiment of the vapor recovery system 10 is disclosed. Similar to other recovery systems known in the art, e.g. VCUs and VRUs, the disclosed vapor recovery system 10 includes a feeding system 15 that includes a vapor byproduct source 20 that is configured to store hydrocarbon vapors or VOCs. These vapor byproduct sources 20 can take many forms, including for example, a loading rack used for loading/offloading from a barge, railcar or ship, or alternatively, an offshore loading platform using a very large crude carrier (VLCC). Other examples include the saturated hydrocarbons found in ballast water for bulk liquid transport via ship or barge. The ballast water has saturated hydrocarbons that is typically degassed and flared prior to returning back to a ship or barge. An additional example would be the storage of light hydrocarbons in salt dome caverns by use of brine displacement. The brine has saturated hydrocarbons that is typically degassed and flared prior to returning brine back to the brine ponds. An additional example would be the vapor space on geodesic domes of stabilized crude storage tanks or any API Tank needing to reduce greenhouse gas emissions. An additional example would be the vapor found inside a Fixed Roof or an Internal Floating Roof of an API Storage Tanks.

The hydrocarbon vapors or VOCs from these vapor byproduct sources 20 are then fed into a gas/liquid separator 30, such as a knock-out pot or degasser, that is configured to remove bulk liquids and particles from the vapor gas to form a purified vapor.

Unlike preexisting systems, the next phase of the vapor recovery system 10 describes the combustion system 40 and illustrates how the purified vapors are converted into renewable energy. The combustion system 40 includes a compressor 60, a natural gas supply 70, and a generator 80. The combustion system 40 may require a blower 50 to pump the purified vapors to the compressor 60.

As shown in FIG. 1, the purified vapors from the gas/liquid separator 30 are fed into the blower 50, which pumps the purified vapor gas to the compressor 60. The compressor 60 is equipped with a motor 90 operable to compress the purified vapor gas to 50-75 psig to eliminate any heavy hydrocarbons that could potentially have a scavenging sulfur and nitrogen species not suitable for combustion and emissions. The purified vapors will be compressed using either a positive displacement compressor or liquid ring vacuum pump depending on system flow rates. For example, a suction scrubber, positive displacement compressor, and coalescing filter are required for high flow rate scenarios. Conversely, a liquid ring vacuum pump, liquid seal pot, heat exchanger, recirculating pump, cooling water, and coalescing filter are required for lower flow rate scenarios. This component of compression of fugitive emissions removes a significant amount of the heavier hydrocarbon chains found in fugitive emissions. This compression will range from 50-75 psig depending on geographical location, selected hydrocarbon or bulk liquid, bulk liquid temperature, loading method, and ambient temperature. Some of the heavy hydrocarbons and any humidity will change phase to a liquid and sent back to the knock out pot via a mechanical coalescer 35. After compression, a steady state continuous operation will occur by means of a storage system 85.

For purposes of the disclosed system 10, any generator 80 that operates on a combustible fuel mixture to generate electricity can be used. However, the preferred form of a generator 80 is a microturbine. The preferred microturbine requires inlet pressures between 75-85 psig and a fuel mixture that includes 30-45% natural gas for combustion. To ensure efficient destruction of VOCs using the microturbines, the system 10 may employ testing at certain nodes.

For the preferred combustion system 40, the micro turbine generator 80 is used in combination with a gas storage system 85 and an eductor (not shown). The storage system 85 will utilize the process of a Main, Regen, Guard method with pressurized storage vessels. The Main Vessel is fully pressurized, the Regen Vessel is currently being compressed, and the Guard Vessel is on standby which is either pressurized or unpressurized as it is on guard. The use of this method allows for an intermittent source of fugitive emissions to become continuous or steady-state by using pressurized vapor at all times with the use an eductor to supply natural gas for clean combustion in a micro turbine, which is often incorporated on the same skid as the calorimeter and density meter 105 shown in the figure. The eductor will utilize higher pressure natural gas typically found at 80-120 psig (typical delivered LP pipeline natural gas) to create a venturi effect for dispersion of vapor and natural gas. This eductor will also be sized accordingly to meet the inlet pressure requirements of the micro turbine. The natural gas and pressurized vapor will be controlled via flow control valves 75 to ensure proper mixing or ratio for clean combustion. In addition, a calorimeter and density meter (BTU Analyzer) 105 may be used to determine the proper mixture for clean combustion by measuring the Higher Heating Value (HHV) and Wobble Index of the pressurized vapor and the mixture of natural gas and vapor in the common fuel header. The combustion mixture needs to meet the needs of clean combustion for the micro turbine to work efficiently. This mixture is based on the sample gas from pressurized vapor and sample gas of the resultant mixture of natural gas and vapor in the common fuel header. The samples are drawn from the sample lines 65 shown in FIG. 1.

The fuel mixture 95 is then routed to the inlet of the micro turbine generator 80 which has a detonation arrestor and an inlet fuel shut off valve for safety. The fuel mixture 95 comprises 30-45% natural gas making it suitable for combustion. This type of testing in combination with the use of a microturbine can result in 99% VOC destruction. The electricity generated from the generator 80 can be recirculated back into the system 10 to power other components, energy storage, or can be sold back to the power grid 120.

Turning to FIG. 2, a table is shown comparing the efficiencies in converting the vapor byproduct into electricity. This table shows the different scenarios of various fugitive emissions sources when loaded at a terminal, facility, or refinery, and the potential electricity supply to the grid. In all cases, there is an overall efficiency gain comparatively to existing technologies as this is considered a waste stream. This efficiency gain was calculated by the net energy into the system over the net energy out of the system.

In yet another embodiment, the disclosed system 10 includes a heat recovery system 100 operable to perform heat recovery from the exhaust gases released from the generator 80. The heat recovery system includes a heat pump 110 operatively coupled a continuous emission monitoring system (CEMS) analyzer 115. The CEMS analyzer 115 can be used to analyze exhaust emissions from the generators of the system to ensure compliance with environmental emission standards. For embodiments using a micro turbine as the generator, the micro turbine also produces high temperature exhaust gas which can be used for combined heat and power, after-treatment (Catalytic Converters, Scrubber, Urea Injection, Carbon Capture), or bypassed to atmosphere. The combined heat and power method has several options by using a heat exchanger to produce hot water, generate additional electricity using the Organic Rankin Cycle, or usable heat for a drying process.

The invention is not limited to the illustrative embodiments, and encompasses variations and alterations of these embodiments. Although the present invention has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present invention, are contemplated thereby, and are intended to be covered by the following claims. For the purposes of promoting an understanding of the principles of the invention, reference has been made to the preferred embodiments illustrated in the drawings, and specific language has been used to describe these embodiments. However, this specific language intends no limitation of the scope of the invention, and the invention should be construed to encompass all embodiments that would normally occur to one of ordinary skill in the art. The particular implementations shown and described herein are illustrative examples of the invention and are not intended to otherwise limit the scope of the invention in any way. For the sake of brevity, conventional aspects of the system (and components of the individual operating components of the system) may not be described in detail. Furthermore, the connecting lines, or connectors shown in the various figures presented are intended to represent exemplary functional relationships and/or physical or logical couplings between the various elements. It should be noted that many alternative or additional functional relationships, physical connections or logical connections may be present in a practical device. Moreover, no item or component is essential to the practice of the invention unless the element is specifically described as "essential" or "critical". Numerous modifications and adaptations will be readily apparent to those skilled in this art without departing from the spirit and scope of the present invention.

What is claimed is:

1. A vapor recovery system comprising:
   a feeding system operatively coupled to a combustion system,
   said feeding system comprising a plurality of vapor byproduct sources capable of producing a vapor of volatile organic compounds, and a gas liquid separator operable to separate liquids and particulates from said vapor to create a purified vapor,
   said combustion system comprising a compressor, a natural gas supply, a gas storage system, and a generator, wherein said compressor is operable to pressurize said purified vapor to a pressure in the range of 50-75 PSIG to form a fully pressurized vapor,
   wherein said gas storage system comprises three pressurized storage containers configured to operate interchangeably to provide a steady state of said fully pressurized vapor to said generator,
   wherein a first container is fully pressurized to 50-75 PSIG, a second container is under compression by said compressor, and a third container is either pressurized or unpressurized, wherein each of said containers is fluidly connected to said compressor and said generator,
   wherein said first container is configured to feed said generator with said fully pressurized vapor,
   wherein said second container is operable to serve as a fully pressurized container to feed said generator with said fully pressurized vapor when said first container becomes depressurized, and
   wherein said third container is operable to serve as a fully pressurized container to feed said generator with said fully pressurized vapor when said first and said second container are depressurized,
   wherein said natural gas supply is operable to enrich said purified vapor with natural gas to form a fuel mixture, said fuel mixture comprising 30-45% natural gas, and
   said generator operable for converting said fuel mixture into electricity.

2. The system of claim 1 wherein said generator is a microturbine.

3. The system of claim 1, further comprising a calorimeter and density meter operable to determine if said fuel mixture will allow for destruction of ninety-nine percent (99%) of said purified vapor by said generator.

4. The system of claim 3, further comprising a continuous emission monitoring system analyzer operable to analyze exhaust emissions from said microturbine.

5. The system of claim 1, further comprising a heat recovery system operable to convert exhaust gas from said generator into reusable energy.

6. The system of claim 5 wherein said heat recovery system comprises a heat pump.

7. A method for converting a vapor of volatile organic compounds into reusable energy, said method comprising the steps of:
   separating liquids and particulates from said vapor of volatile organic compounds to create a purified vapor;
   compressing said purified vapor to a pressure in the range of 50-75 PSIG to form a fully pressurized vapor;
   storing said fully pressurized vapor in a gas storage system, wherein said gas storage system comprises three pressurized storage containers configured to operate interchangeably to provide a steady state of fully pressurized vapor to a generator,
   wherein a first container is fully pressurized to 50-75 PSIG, a second container is under compression by a compressor, and a third container is either pressurized or unpressurized, wherein each of said containers is fluidly connected to said compressor and said generator,
   wherein said first container is configured to feed said generator with said fully pressurized vapor,
   wherein said second container is operable to serve as a fully pressurized container to feed said generator with said fully pressurized vapor when said first container becomes depressurized, and
   wherein said third container is operable to serve as a fully pressurized container to feed said generator with said fully pressurized vapor when said first and said second container are depressurized,
   a natural gas supply is operable to enrich said purified vapor with natural gas to form a fuel mixture,
   enriching said fully pressurized vapor with natural gas from said natural gas supply to form the fuel mixture comprising 30-45% natural gas; and
   combusting said fuel mixture in said generator to create electricity.

8. The method of claim 7 wherein said generator is a microturbine.

9. The method of claim 8, further comprising the step of providing a heat recovery system operatively coupled to said microturbine.

10. The method of claim 9, further comprising the step converting an exhaust gas from said microturbine into reusable energy using said heat recovery system.

\* \* \* \* \*